(12) United States Patent
Kupferschmid

(10) Patent No.: US 6,196,647 B1
(45) Date of Patent: *Mar. 6, 2001

(54) VERTICAL MEDIA STORAGE SYSTEM

(75) Inventor: David W. Kupferschmid, Upper Grandview, NY (US)

(73) Assignee: Grandview Designs, Inc., Upper Grandview, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/287,433

(22) Filed: Apr. 7, 1999

Related U.S. Application Data

(63) Continuation-in-part of application No. 09/016,006, filed on Jan. 30, 1998, now abandoned.
(60) Provisional application No. 60/036,070, filed on Jan. 30, 1997.

(51) Int. Cl.[7] .................................................. A47B 81/06
(52) U.S. Cl. ....................... 312/9.48; 312/9.56; 312/9.63; 211/41.12; 220/528
(58) Field of Search ........................ 206/1.5, 40, 308, 206/308.1, 307, 387.1, 387.12, 387.15, 450, 558, 815; 220/23.89, 508, 528, 546; 211/41.1, 41.12, 41.17, 49.1, 126.3, 184, 4, 8, 126.15, 126, 126.12, 208, 190; 312/9.47, 9.22, 9.48, 205, 9.52, 9.17, 9.53, 9.54, 9.55, 9.56, 9.28, 306, 206; 248/203; 194/41, 49, 64; 108/110, 109

(56) References Cited

U.S. PATENT DOCUMENTS

| 360,547 | 4/1887 | Winslow . |
| 388,066 | 8/1888 | Murphy . |
| 1,176,508 | 3/1916 | Williams . |
| 2,062,802 | 12/1936 | Walker . |
| 2,992,742 | * 7/1961 | Pendergrast, Jr. ................... 211/59.4 |
| 3,613,895 | 10/1971 | Larkin . |
| 4,366,903 | 1/1983 | Gaiser et al. . |
| 4,789,071 | 12/1988 | Larsson ................................ 211/208 |
| 5,111,940 | * 5/1992 | VanNoord ............................ 211/162 |
| 5,201,414 | 4/1993 | Kaszubinski . |
| 5,251,749 | 10/1993 | Knight . |
| 5,334,904 | 8/1994 | Kramer . |
| 5,370,243 | 12/1994 | Rosario . |
| 5,505,299 | 4/1996 | Ditzig et al. . |
| 5,531,516 | 7/1996 | Peng . |
| 5,558,229 | * 9/1996 | Halbich ................................ 206/558 |
| 5,568,873 | 10/1996 | Gioscia . |
| 5,577,620 | 11/1996 | Jacob . |
| 5,584,397 | 12/1996 | Cheng . |
| 5,704,474 | 1/1998 | Oland . |
| 5,740,924 | 4/1998 | Hunt . |
| 5,746,325 | 5/1998 | Lee . |
| 5,788,088 | 8/1998 | Kao . |

FOREIGN PATENT DOCUMENTS

| 31 23 193 A1 | 12/1982 | (DE) . |
| 0 490 671 B1 | 3/1996 | (EP) . |

* cited by examiner

Primary Examiner—Peter M. Cuomo
Assistant Examiner—Jerry A. Anderson
(74) Attorney, Agent, or Firm—Lerner, David, Littenberg, Krumholz & Mentlik, LLP

(57) ABSTRACT

The invention comprises a storage system that facilitates the adjustment and rearrangement of vertically-stacked components comprising two oppositely-faced panels and a plurality of carriers having opposing side walls and a rear wall to provide a cavity for holding a unit to be stored, the carriers being stacked between the oppositely-faced panels in vertical array and being positioned relative to the oppositely-faced panels such that the carriers may be slidably moved in a vertical direction relative to the panels but positioned against removal from between the panels through the combination of a protuberance and recess interlock between the panels and each carrier, said protuberance being retractable from the recess to allow entry and egress of each carrier from the panels.

23 Claims, 9 Drawing Sheets

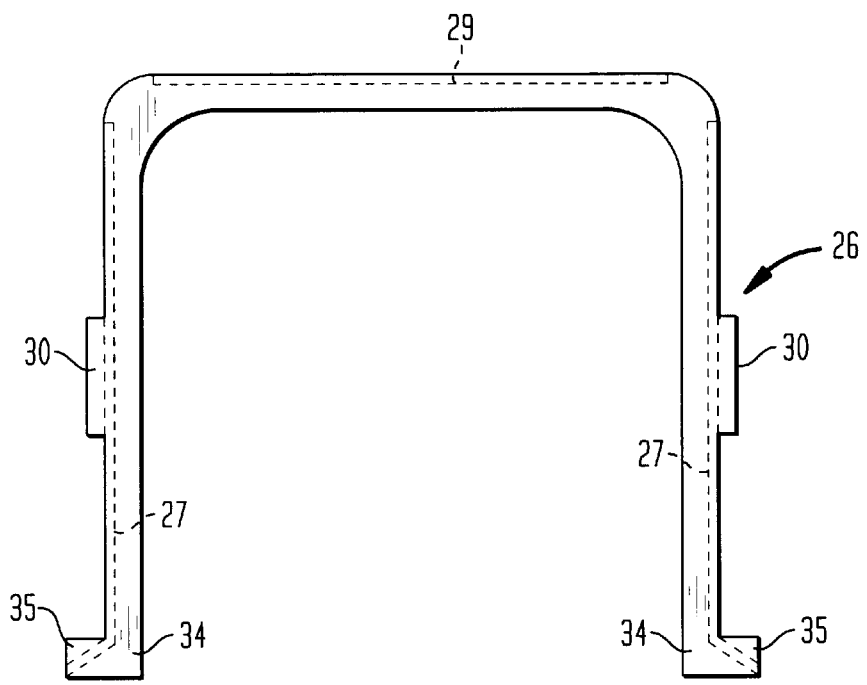
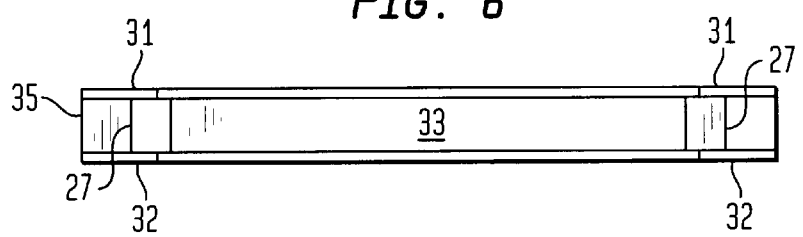

VERTICAL MEDIA STORAGE SYSTEM

This invention is a continuation-in-part of U.S. patent application Ser. No. 09/016,006, filed Jan. 30, 1998, now abandoned which application claims the benefit of U.S. Provisional Application Serial No. 60/036,070, filed Jan. 30, 1997.

This invention relates to a system for storing vertically stacked units, such as, for example, compact discs (CD) and digital versatile discs (DVD), wherein a pre-determined positional placement of an added unit(s) within the stacked units is facilitated.

While reference is made hereafter to CD's in explaining and illustrating the invention, it should be understood that the invention is applicable to storage systems of vertically stacked media generally wherein the media is stored in a carrier which is positioned in the vertical stack of the storage system.

BACKGROUND OF THE INVENTION

Currently, the most popular storage system for CD's relies on fixed tracks or slots in which the CD's, within their respective cases, are inserted into a fixed track unit or slot and removed from the track for use.

In a CD storage system wherein a system of organization such as alphabetizing or grouping is to be maintained, the prior art unitary track or slot system creates a problem when additional CD's are sought to be added to the system. In order to create an open track or slot at a particular position in the vertical stack, each and every CD above or below the track or slot to be voided for insertion of the additional CD must be moved one track or slot, up or down. Such a system is inconvenient and time consuming and tends to direct the person storing the CD's away from an organized storage system.

A further problem is that some CD's come in a double CD case which requires the physical space of two tracks or slots without any partition between them. In this situation, it is impossible to store a double CD case in a storage system unless the system provides a double space track. Where a double space track is provided, its location is fixed, thus, not permitting a system of organization.

Accordingly, several objects and advantages of my invention are the ease in which a specific track or slot may be made available for an additional CD, assuming, of course, that the storage system is not at full capacity. There is no need to remove each CD as required by a fixed track/slot system, blocks of CD's being moved up or down without need for removal of each and every CD as in the prior art.

Another object and advantage is the ability to insert different size CD cases anywhere within the storage unit. This allows double CD cases to be stored anywhere in the storage unit by simply removing two single storage carriers and replacing them with a single double carrier.

Further objects and advantages of my invention will become apparent from a consideration of the drawings and ensuing description.

SUMMARY OF THE INVENTION

In its broadest aspect, the invention comprises a storage system that facilitates the adjustment and rearrangement of vertically-stacked components comprising two oppositely-faced panels and a plurality of carriers having opposing side walls and a rear wall to provide a cavity for holding a unit to be stored, the carriers being stacked in vertical array between the oppositely-faced panels and being positioned relative to the oppositely-faced panels such that the carriers may be slidably moved in a vertical direction relative to the panels but positioned against removal from between the panels through the combination of a protuberance and recess interlock between the panels and each carrier, said protuberance being retractable from the recess to allow entry and egress of each carrier from the panels.

In one embodiment, the invention comprises a storage system having oppositely facing storage panels each with a recess or track along its length and a carrier for the units to be stored having on each side thereof a retractable protuberance which is positioned on the carrier so as to be received in the recess of each panel when the carrier is fully inserted into the storage system.

In a particular embodiment of the carrier of this invention, the carrier is a three-sided member, rectangular in shape, and having two side members joined to a back member and having an open end for receiving the media unit to be stored; each side wall of the carrier having a protuberance positioned so as to be received in the recess of each oppositely faced panel, the joinder of each side wall with the back wall being sufficiently flexible to permit clearing the protuberance from the respective panel recesses when the side walls are flexed toward each other.

In a further embodiment of the panels and the carrier, the recess of each panel has a series of scallop-shaped undulations along its length and the protuberances on the carrier are shaped to have the most extended portion of the protuberance received within the deepest portion of the scallop-shaped undulation on the oppositely facing panels. The advantages of this embodiment will be explained hereafter.

As an improvement to the broadest aspect of the invention, a further protuberance and recess interlock in the path of egress of the carrier from the oppositely-faced panels is provided such that movement of the carrier to the second interlock position precludes slidable movement in a vertical direction of the carrier positioned at the second interlock thereby providing a support against vertical descent of the carriers arrayed above the carrier at the second interlock position.

As an improvement to the embodiment having a panel recess and protuberances on the outer side walls of the carrier, a panel and carrier configuration is provided that stabilizes in place all carriers above a desired location, thus permitting only carriers below the desired position to descend when a carrier below the desired position is removed. In the preferred form of the panel configuration of the improvement, each panel has a plurality of horizontal slots for receiving the retractable protuberance on the opposing side walls of a carrier, the slot extending a limited distance beyond the boundary of the panel recess nearest the carrier exit. In a preferred form of the panels and carriers of the improvement, each of said slots and the protuberances on the opposing side walls of the carrier have a mating locking surface that stabilizes the carrier in a locked-out position between the panels. In said locked-out position, the rearward portion of the carrier is disposed across the width of the panel recess and acts to support all overlying carriers.

IN THE DRAWINGS

FIG. 5 is a plan view of an embodiment of a carrier of this invention.

FIG. 6 is a front view of the carrier of FIG. 5.

FIG. 7 is a side view of the carrier of FIG. 5.

DETAILED DESCRIPTION OF THE INVENTION

Figure 1:
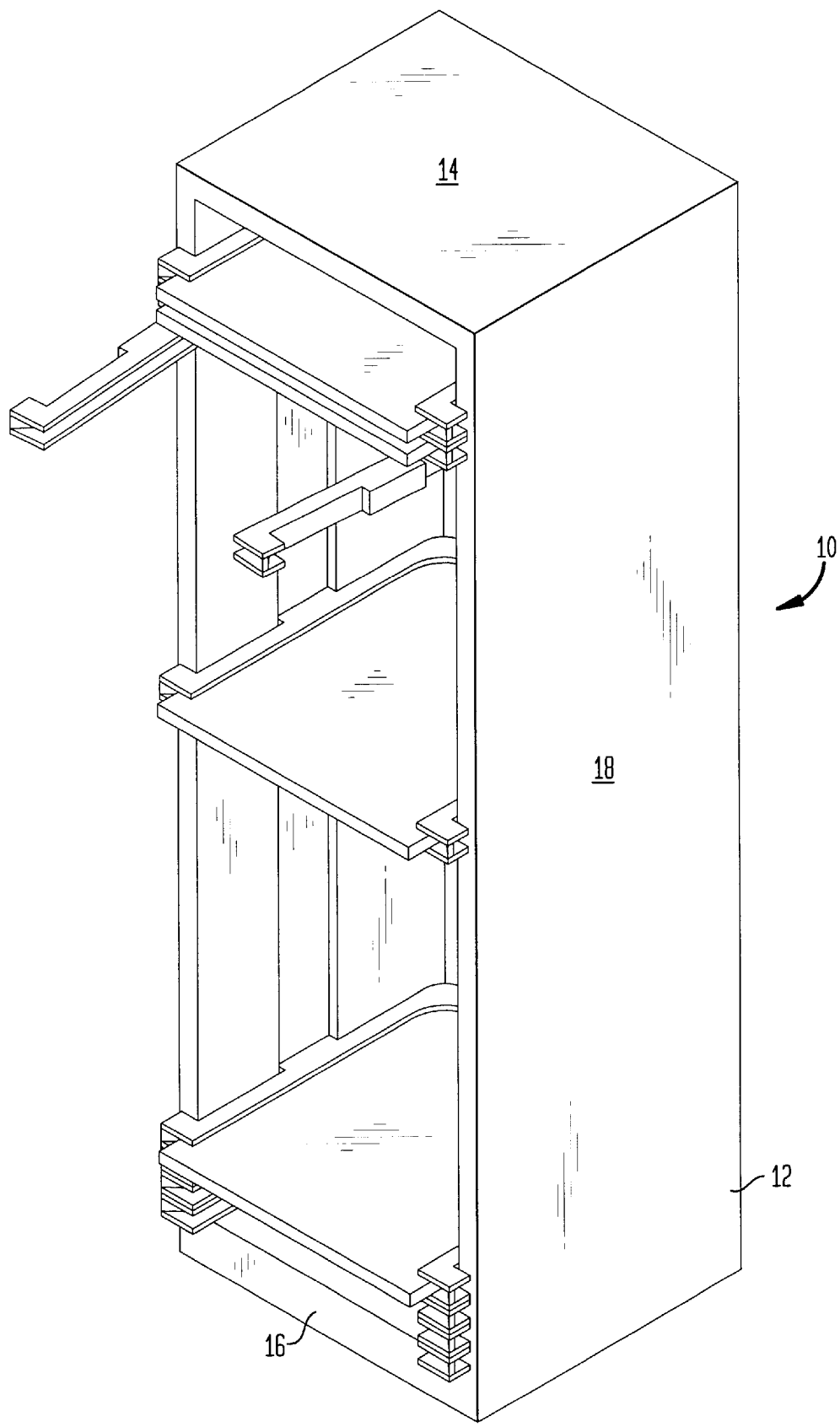
FIG. 1 is a perspective view of a CD stand having an embodiment of the panels and carrier of this invention.

In FIG. 1, the storage unit, generally designated as 10, comprises a stand 12 having top, bottom, back (not shown) and side walls, 14, 16, 18 and 20, respectively. Best shown in FIG. 4, mounted on opposing side walls 20 of the stand 12 are panels 22, which panels 22 have a centrally disposed recess 24 transversing the length of the panel 22. Stacked within the stand 12 is a plurality of carriers 26; each carrier (best shown in FIGS. 5–7) being configured to receive a CD in its opening 33. A protuberance 30 is disposed on each side wall 27 of the carrier 26 that is sized to fit within the recess 24 in each of the panels 22; the protuberance 30 functioning to foreclose the removal of the carrier 26 from the panels 22 when the protuberance 30 is positioned within the recess 24 of the panels 22.

Figure 2:
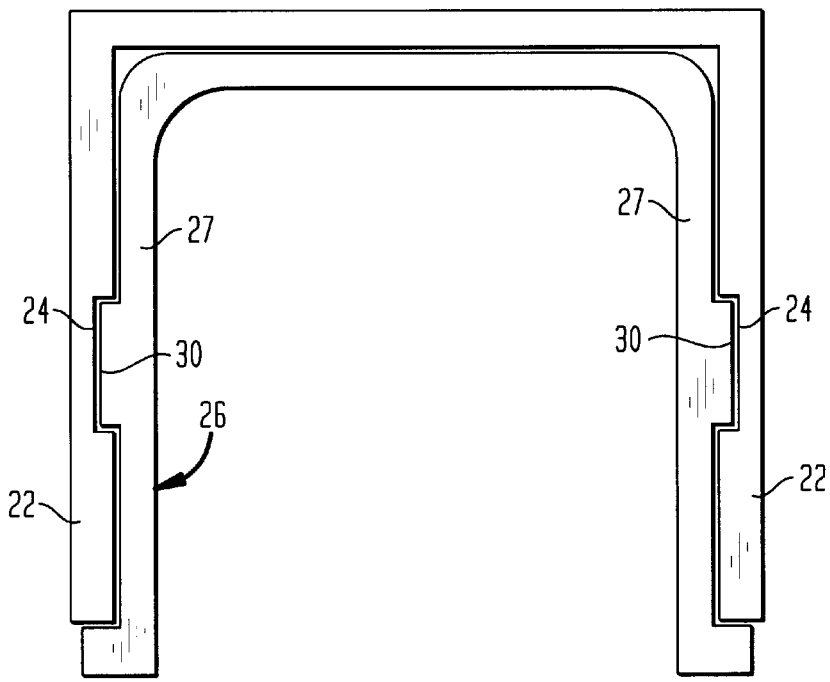
FIG. 2 is a schematic plan view of a first embodiment of a single carrier of this invention disposed within a segment of the recess or track of the panels of this invention.

In FIG. 2, an embodiment of the carrier 26 is shown fully inserted into the panels 22 with the protuberances 30 positioned within the recess 24 of each of panels 22. Not shown in FIG. 2 are a plurality of vertically stacked carriers beneath the carrier 26.

Figure 3:
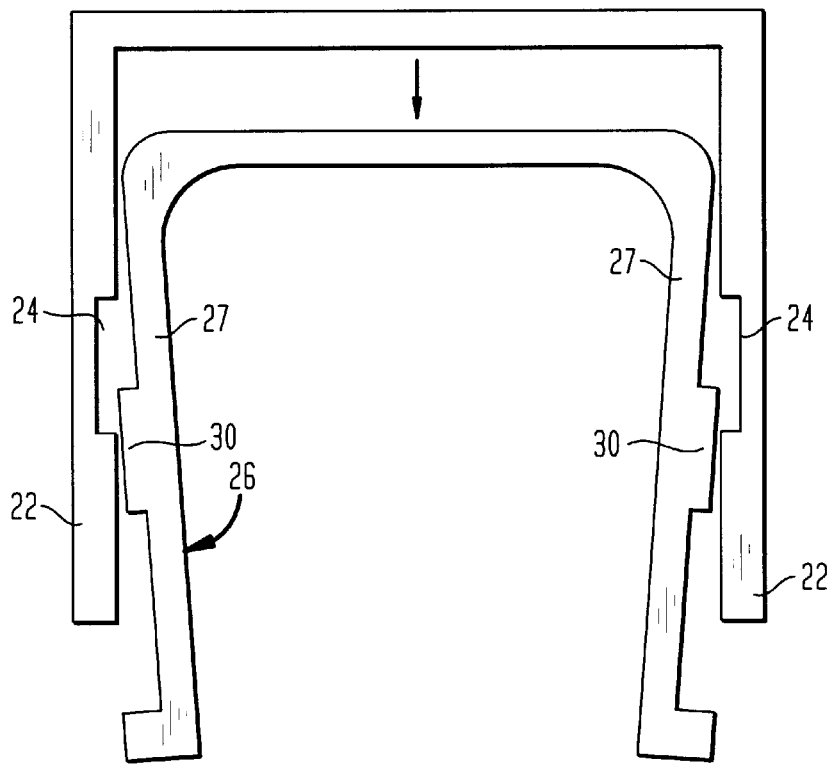
FIG. 3 is a schematic plan view of an embodiment of a single carrier of this invention partially withdrawn from the panel of this invention.

In FIG. 3, the carrier 26 is shown partially removed from the panels 22. This is accomplished by the inward flexure of the side walls 27 of the carrier 26 so as to deliver the protuberance 30 in each side wall 27 of the carrier 26 out of registry with the recess 24 in each of the panels 22. The carrier may be fully removed from the panels by forwardly pulling the carrier from the stand while the carrier is in a flexed position.

Figure 4:
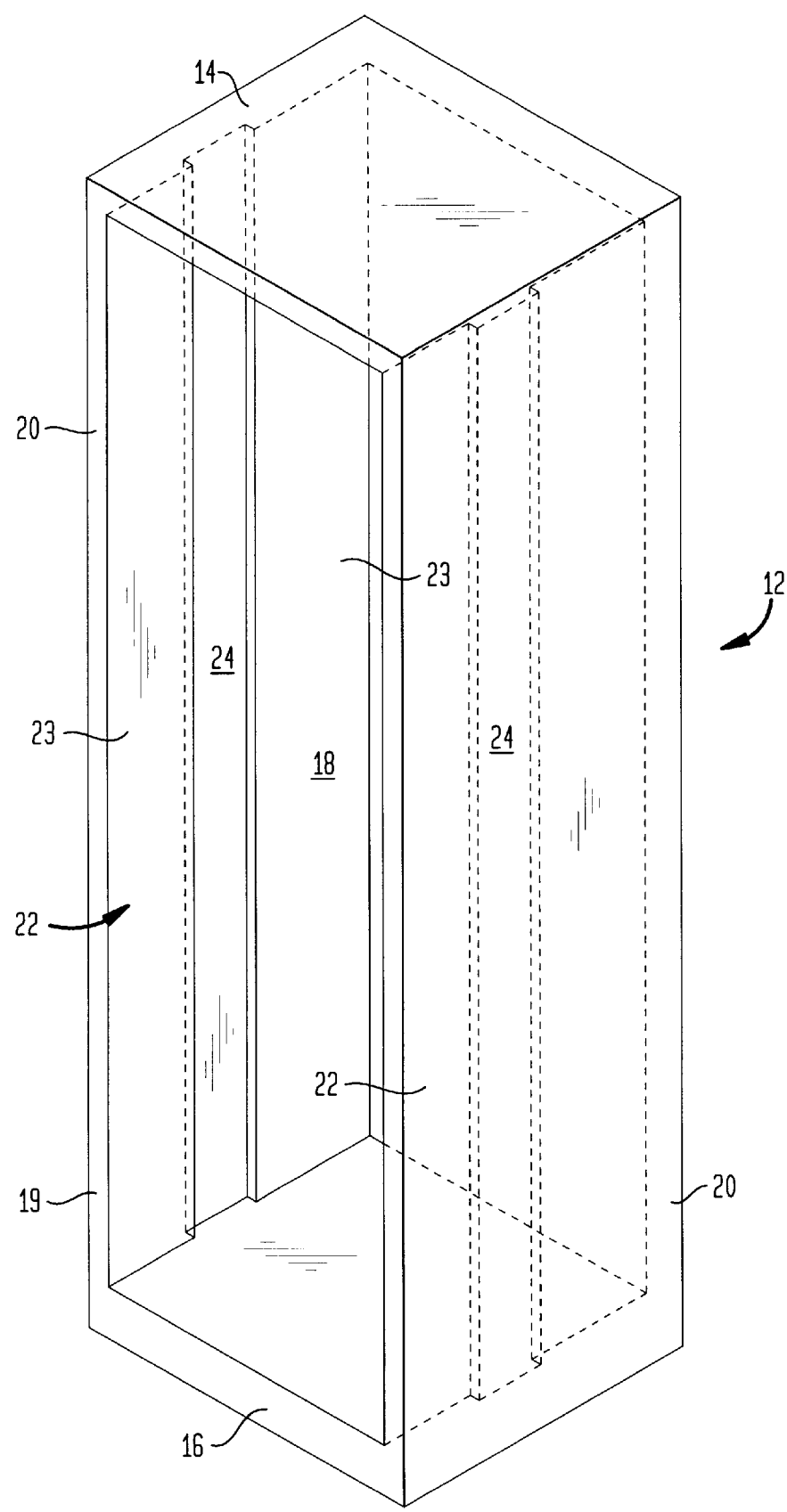
FIG. 4 is a perspective view of a storage unit showing an embodiment of a panel of this invention.

In FIG. 4, the stand 12 comprises a top wall 14, a bottom wall 16, back wall 18 and two oppositely facing side walls 20. Disposed on each side wall 20 is a panel 22, the panel on the right side wall being shown in phantom by dotted lines. Each panel 22 extends the full height of the side wall 20 and comprises raised portions 23 defining a recess 24, which recess functions as a track for the carrier (not shown) to move in an up or down direction along the panels 22.

It should be understood that the panel of this invention need not be used with the stand 12 shown in FIG. 4 but the panels 22 could be affixed to any parallel and spaced surfaces and, together with the carrier of this invention, function as a storage system that facilitates the organized placement of the carriers of this invention.

In FIG. 5 is shown an embodiment of a carrier of this invention. The carrier, generally designated as 26, has flexible side walls 27 terminating in a rear wall 29; the side walls 27 and rear wall 29 having upper and lower extensions 31 and 32 (see FIG. 6), respectively, disposed normal to the side and back walls, which side wall and its extensions and the back wall and its extensions define a channel 33, the channel 33 serving to isolate and support a CD inserted therein. Each of the side walls 27 has a protuberance 30 disposed approximately mid-way along the length of the side wall that is sized so as to be received in the recess 24 of the panels 22. Additionally, the forward portion 34 of the side walls 27 extends beyond the front edge of the panels 22 and terminates in a gripping surface 35, which may be gripped to inwardly flex the side walls of the carrier 26. Further, the outwardly extending portion 35 provides a means for grabbing the carrier, squeezing the side walls of the carrier toward each other to de-register the protuberances on the side wall of the carrier from the recess in each of the panels and thereby facilitate removal of the carrier from the panels.

In using the panels/carrier of this invention to selectively place a CD at a predetermined position in a vertical stack of CD's, the following steps are taken:

1) an empty carrier, that is, a carrier without an encased CD, is removed from the panel, such removal causing all carriers above the removed carrier to fall one position;

2) the fore retention means of the carrier positioned at the site where a new carrier/CD is desired is elevated sufficiently to create an opening in the stack to receive the new carrier/CD;

3) the new carrier/CD is then inserted in the vertical stack at the opening.

Thus, it is seen that the storage system of this invention allows for the organizational placement of CD's by the removal of a single carrier.

Figure 8:
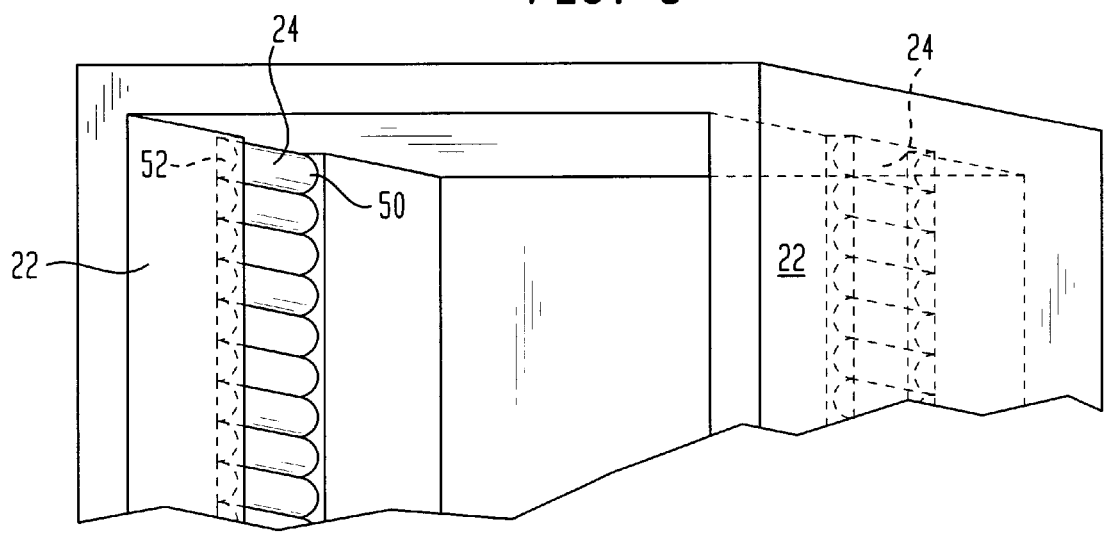
FIG. 8 is a partial perspective view of a further embodiment of the panel of this invention.
Figure 9:
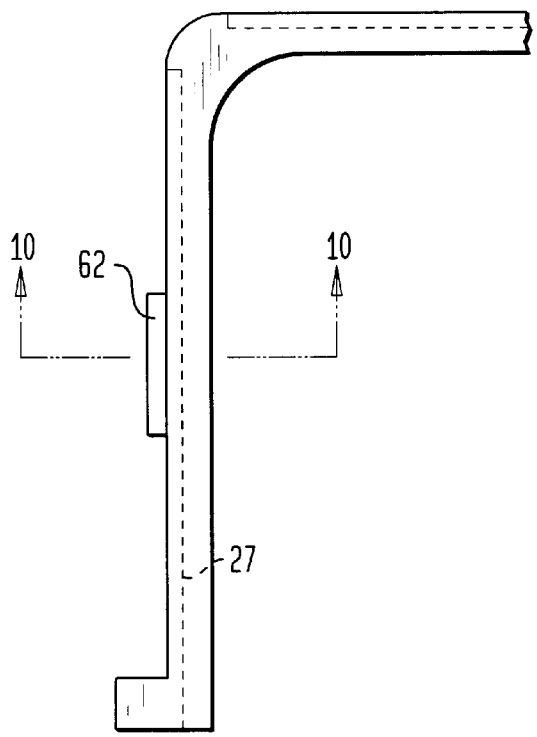
FIG. 9 is a partial plan view of a further embodiment of the carrier of this invention.
Figure 10:
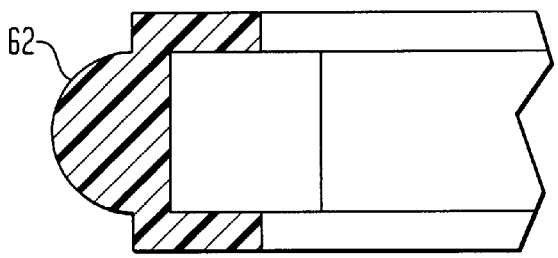
FIG. 10 is a partial enlarged cross-sectional front view of the carrier of FIG. 9.

FIGS. 8–10 show a second embodiment of the panels/carrier of this invention wherein one or more carriers may be removed from the panel without having the carriers above the removed carrier(s) drop.

In FIG. 8, the panel 22 has a recess 24 wherein the bottom 50 of the recess comprises a series of scallop-shaped undulations 52, the distance between the points of furthest radially inward projection of successive scallop-shaped undulations being set so as to receive in a mating relation semi-circular shaped protuberances 62 positioned on the side walls of each carrier. FIG. 10 best shows the shape of the protuberances 62.

In using the embodiment of FIGS. 8 and 9, the mating of the surfaces of the recess of the panels and the protuberances on the carrier will provide a sufficient interlock force such that removal of a carrier from the vertical stack will not result in the collapse of the stack above the removed carrier; yet the interlocking force is sufficiently weak to allow for collapsing the vertical stack upon the application of a manual force.

To positionally insert a carrier (for ultimate acceptance of a CD) in a system having the panels/carrier embodiment of FIGS. 8 and 9, the following steps are taken:

1. Assuming a full stack of CD's totalling twenty (20) in number wherein the user wishes to dispose a new carrier in the fifth position from the top and wherein there is an empty carrier (no CD) in the tenth position from the top;

2. Remove the empty carrier from the tenth position;
3. Exert a downward force on the carrier in the fifth position;
4. The downward force will cause the carriers in the fifth through ninth position to move one position downward creating an opening in the fifth position for insertion of the empty carrier. After positioning the empty carrier, insert the CD.
5. Conversely, if the empty carrier is positioned above the position where it is desired to insert a carrier, the empty carrier is removed, the carriers at and above the position wherein the carrier is sought to be placed are moved upwardly and the carrier is inserted in the desired position created by the upwardly moved carriers.

Figure 11:
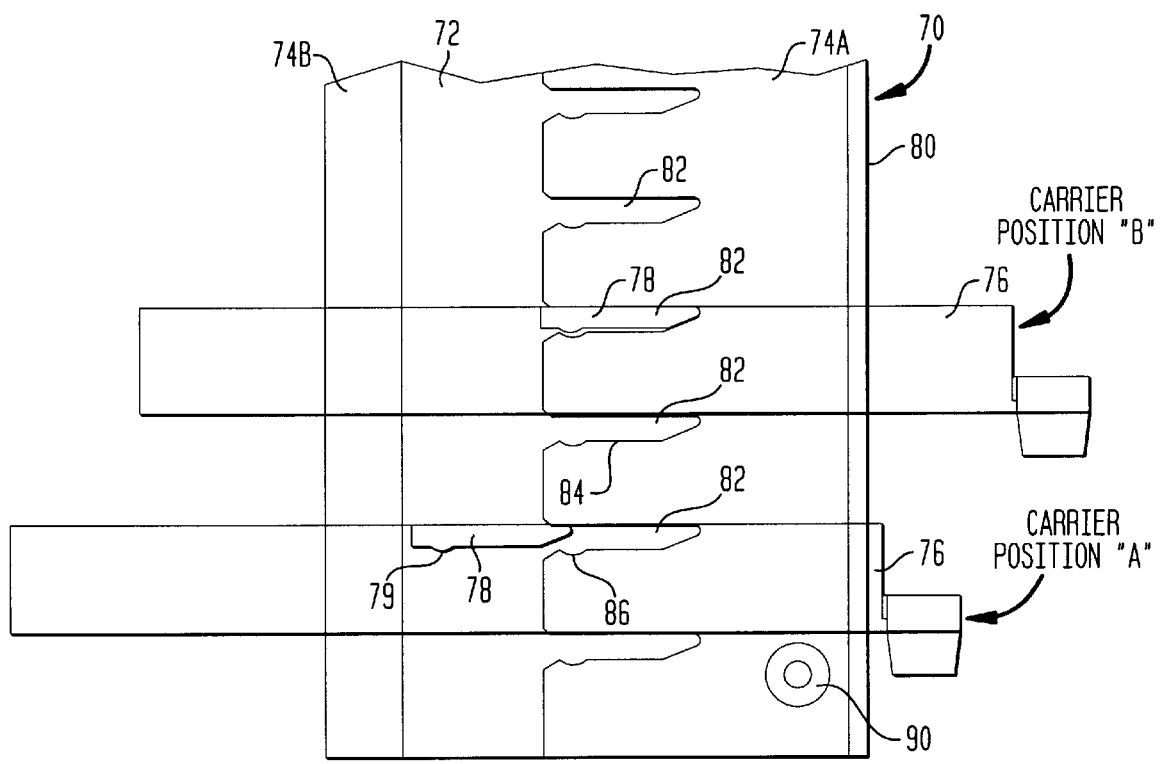
FIG. 11 is a partial schematic of the preferred panel of the CD stand showing carriers in the open and locked positions.

In FIG. 11, there is shown a panel, generally designated as 70, having a recess portion 72 and two raised portions 74, forward portion 74A and rearward portion 74B. As thus disclosed, the panel 70 is identical to the panels of FIGS. 1 and 4, except that the rearward portion 74B is narrower than in FIGS. 1 and 4. Extending from the recess 72 toward the forward end 80 of the panel 70 is a slot 82, the bottom surface 84 defining the slot 82 having a C-shaped depression 86. Further shown in FIG. 11 is a carrier 76, having a protuberance 78 (Carrier Position "A") residing in the recess 72. The bottom surface of the protuberance 78 has a C-shaped protuberance 79. The partial schematic panel of FIG. 11 is disposed within a housing 92, best shown in FIG. 13.

Figure 12:
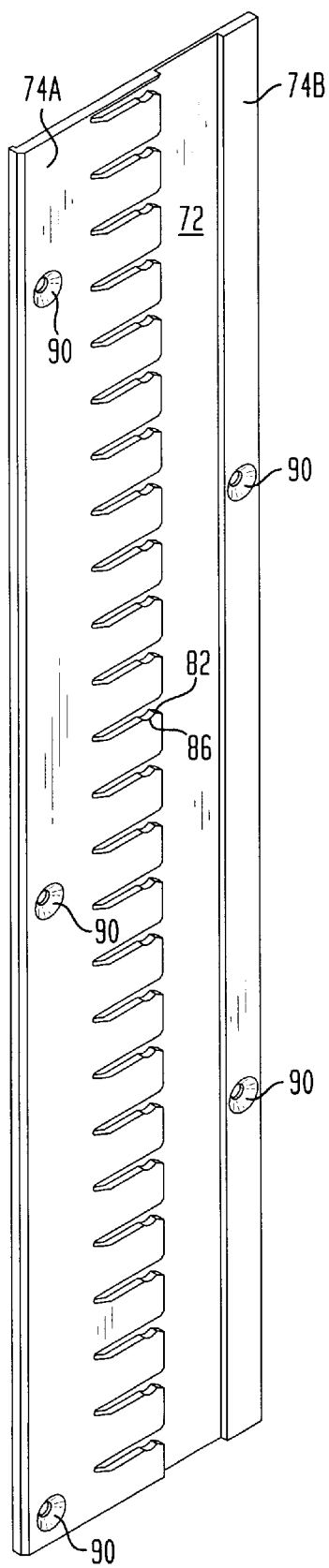
FIG. 12 is a perspective view of a further embodiment of a panel of this invention showing the panel of the schematic of FIG. 11.

Drill hole 90 is shown. FIG. 12 shows the complete panel of FIG. 11 with a series of drill holes 90 for affixing the panel to an outer housing shown best in FIG. 13 at 92.

As shown in Carrier Position "B", (See FIG. 11) the carrier 76 has been moved toward the forward end 80 so that the protuberance 78 resides in the slot 82. By mating the C-shaped depression 86 and the C-shaped protuberance 79, the carrier 76 is stabilized against forward and rearward motion between the panels. The carrier 76 may be returned to its stored position (Carrier Position "A") between the panels by simply applying rearward pressure against the portion of the carrier extending forwardly beyond the panel. Alternatively, the carrier 76 may be completely removed from Carrier Position "B" by moving the side walls of the carrier 76 toward each other to thereby de-register the protuberance/recess interlock and release the carrier from the storage unit. Moreover, such positioning of the carrier 76 (Carrier Position "B") provides a supporting platform for all carriers in vertical array above the carrier at Carrier Position "B."

Figures 14, 14A:
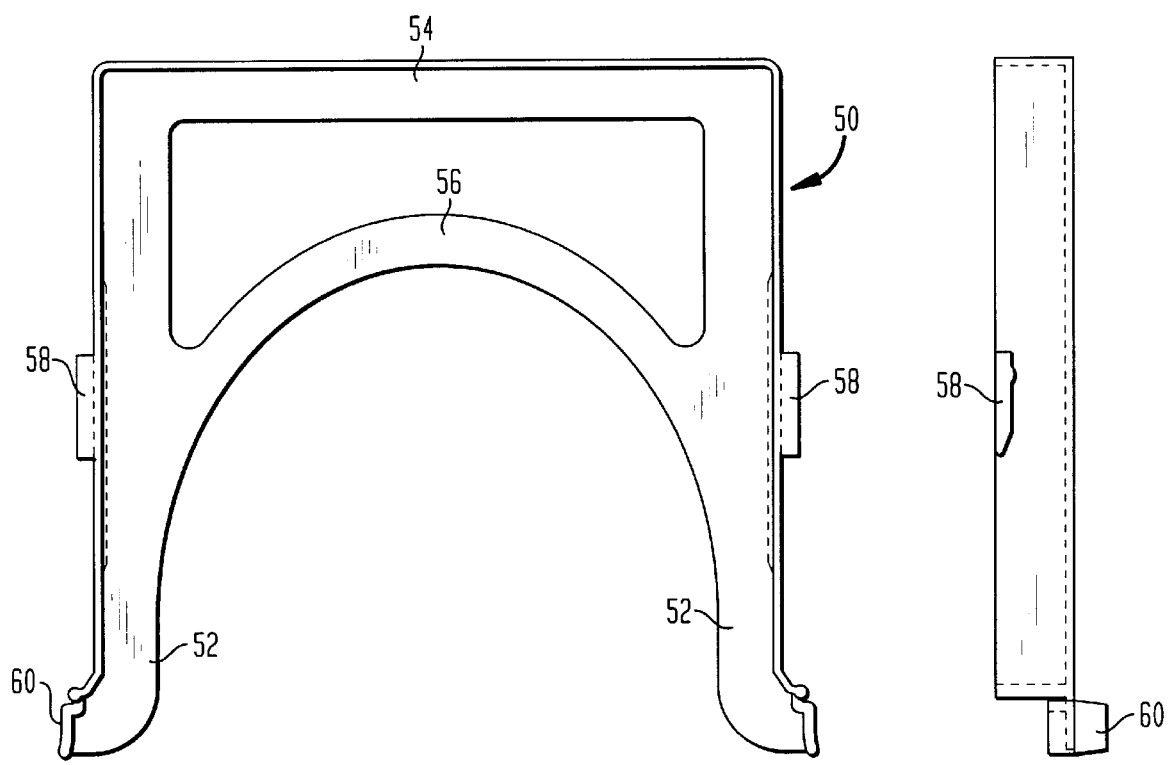
FIG. 14 is a plan view of a preferred form of the carrier of this invention.
FIG. 14A is a side view of the carrier of FIG. 14.
Figure 14B:
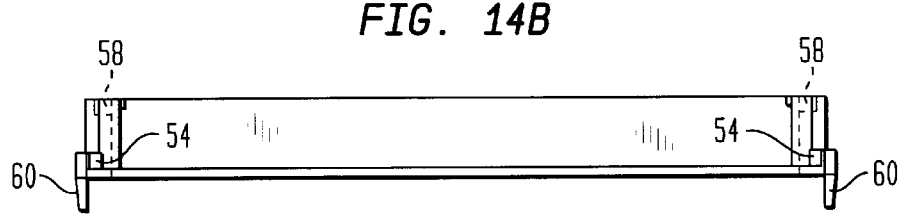
FIG. 14B is a front view of the carrier of FIG. 14.

FIGS. 14, 14A and 14B show the most preferred embodiment of the carrier of this invention. In FIG. 14, the carrier generally designated as 50, has flexible side walls 52 terminating in a rear wall 54. Traversing the space between the respective side walls 52 is a semi-circular arc portion 56 which is integral to the side walls 52. Each of the side walls has a protuberance 58 disposed approximately mid-way along the length of the side wall that is sized so as to be received in the recess 72 (See FIG. 12) of the panels 70. At the forward terminus of the side walls 52 and positioned at the lower portion 54 of the side walls 52 is an extended portion 60 which acts as a gripping surface and serves the purpose described above.

Figure 13:
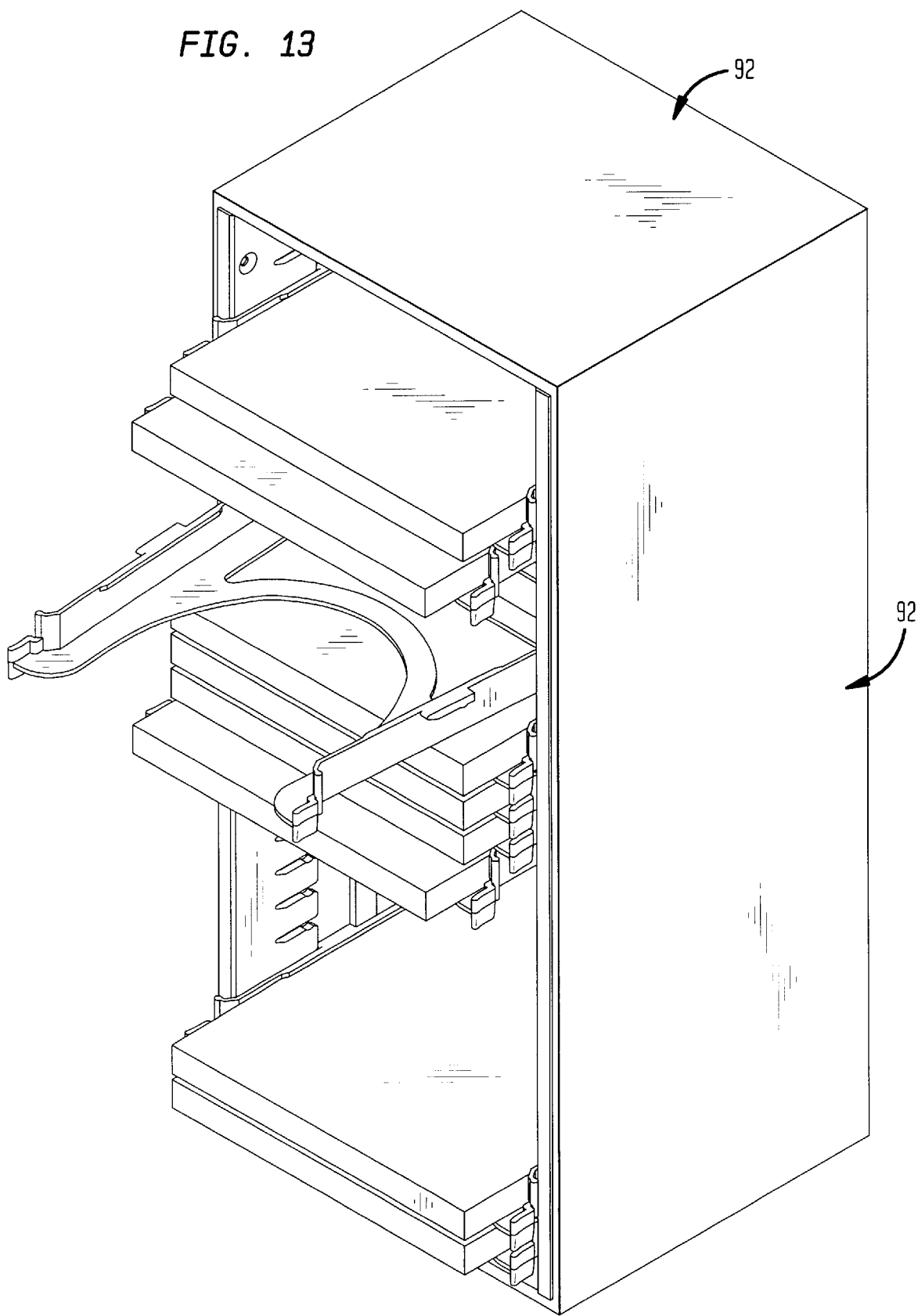
FIG. 13 is a perspective view of a CD stand having the panels of FIG. 12 and carriers in open and locked positions in the CD stand.

With the embodiment of the CD stack shown in FIGS. 11–13, the alphabetizing or other desired repositioning of the carriers in the CD stand may be carried out as follows:

Assume, for example, a 50 carrier capacity unit which has spaces 1–40 occupied with CD-bearing carriers and the user would like to insert a new CD in the 25th position, the user would perform the following steps:

1. Locate the position directly above the point in which a space is needed. In this case it would be the 24th position.
2. Pull the 24th carrier (with the CD still in place) outward until it clicks into the lock-out position.
3. Remove an empty media carrier from the bottom of the unit. At this point all other media carriers below the 24th position will drop one position creating an empty space in the 25th position.
4. Insert the empty media carrier in the 25th position.
5. Push the 24th carrier back into the unlocked position. Operation is now complete.

Having the benefit of the disclosure herein, it will be obvious that multiple carriers, e.g., a double carrier, may be accommodated in the storage system of this invention by the initial removal of the double carrier and following the steps outlined above for both embodiments of the carriers of this invention.

The carriers of this invention may be made of any material having the inherent property of being flexible, e.g., plastic or metal alloys. The stand, including the panels, may be manufactured from wood, metal alloy or plastic materials.

Many possible embodiments may be made without departing from the scope hereof; it is to be understood that all description herein set forth or shown in the accompanying drawings is to be interpreted as illustrative and not in a limiting sense.

I claim:

1. A storage system that facilitates the adjustment and rearrangement of a plurality of individual units comprising a housing having a first end and a second end for said plurality of individual units and a plurality of individual unit carriers for separately retaining said plurality of individual units, each of said plurality of individual unit carriers being slidable within said housing, said housing including a first end wall connected to said first end of said housing, a second end wall connected to said second end of said housing, and a first engagement member and said plurality of individual unit carriers including a second engagement member engageable with said first engagement member, whereby when said second engagement member of one of said individual unit carriers is engaged with said first engagement member said one of said individual unit carriers is slidably movable between said first and second end walls within said housing, and wherein said second engagement member of said one of said individual unit carriers can only be disengaged from said first engagement member when said individual unit is removed from said one of said individual unit carriers, and when said second engagement member of said one of said individual unit carriers is disengaged from said first engagement member, said one of said individual unit carriers is removable from said housing in a direction of egress and replaceable at any location within said housing.

2. The storage system of claim 1 wherein said housing includes a pair of housing side walls and each of said plurality of individual unit carriers includes a pair of opposing carrier side walls, said first engagement member comprising a pair of recesses disposed along the length of each of said pair of housing side walls and said second engagement member comprising a pair of protuberances disposed on each of said pair of opposing carrier side walls, with each of said pair of protuberances being positioned to be received within said pair of recesses upon insertion of said plurality of individual unit carriers within said housing, and said pair of protuberances being retractable from said pair of recesses only when said individual unit is removed from said one of said individual unit carriers in order to remove said individual unit carrier from said housing.

3. The storage system of claim 2 wherein said pair of opposing carrier side walls are flexible, whereby said protuberances are retractable from said recesses by flexing said pair of opposing side walls towards each other to thereby disengage said second engagement member from said first engagement member.

4. The storage system of claim 3 wherein said pair of recesses are centrally disposed along the length of each of said pair of housing side walls.

5. The storage system of claim 3 wherein said pair of carrier side walls includes a forward end and a rearward end, and each of said forward ends of said pair of carrier side walls may be gripped and inwardly flexed thereby.

6. The storage system of claim 1 wherein said plurality of individual unit carriers are vertically stacked in said housing, said housing including a plurality of first stabilizer members and said plurality of individual unit carriers each including a second stabilizer member, whereby upon removal of one of said plurality of individual unit carriers from said vertical stack within said housing each of said others of said plurality of individual unit carriers disposed vertically above said one of said plurality of individual unit carriers is stabilized against gravitational descent within said housing but remains physically slidable within said housing upon the exertion of a predetermined pressure thereon.

7. The storage system of claim 1 wherein said plurality of individual unit carriers are vertically stacked in said housing, said housing including a pair of housing side walls and each of said plurality of individual unit carriers including a pair of opposing carrier side walls, said first engagement member comprising a recess disposed along the length of each of said pair of housing side walls and said second engagement member comprising a protuberance disposed on each of said pair of carrier side walls, with each of said protuberances being positioned to be received within one of said recesses of said pair of side walls upon insertion of said plurality of individual unit carriers within said housing, said protuberances being retractable from said recesses only when said individual unit is removed from said individual unit carrier in order to remove said plurality of individual unit carriers from said housing.

8. The storage system of claim 1 wherein said housing includes a pair of housing side walls and each of said plurality of individual unit carriers includes a pair of opposing carrier side walls, said pair of opposing carrier side walls being sufficiently flexible such that upon removing said individual unit from said individual unit carrier and flexing said pair of opposing carrier side walls towards each other causes said second engagement member to disengage from said first engagement member whereby said plurality of individual unit carriers may be removed from said housing.

9. The storage system of claim 8 wherein said pair of opposing carrier side walls includes outwardly extending projections, whereby said outwardly extending projections can be grasped in order to flex said opposing carrier side walls towards each other.

10. The storage system of claim 7 wherein said plurality of individual unit carriers is movable between a first position within said housing whereby said plurality of individual unit carriers is slidable within said housing and a second position wherein said plurality of individual unit carriers is not slidable within said housing, said housing including a third engagement member, whereby said second engagement member is engageable with said third engagement member when said one of said plurality of individual unit carriers is in said second position to thereby prevent vertical sliding of each of said plurality of individual unit carriers disposed above said one of said plurality of individual unit carriers within said housing.

11. The storage system of claim 10 wherein said third engagement member comprising a plurality of slots extending horizontally from said recess in said direction of egress of said one of said plurality of individual unit carriers from said housing.

12. The storage system of claim 11 wherein said plurality of slots are vertically spaced to receive said plurality of protuberances, said plurality of protuberances being disposed at a location on said carrier side walls whereby a carrier positioned with said protrusion in said slot extends rearwardly a sufficient distance to support said individual unit carriers stacked vertically thereabove.

13. The storage system of claim 12 wherein said plurality of slots are horizontally disposed at a location with respect to said plurality of protuberances whereby said positioning of said protrusion within said slot causes said one of said individual unit carriers to be raised vertically upwardly.

14. The storage system of claim 13 wherein said first engagement surface comprises a depression and said second engagement surface comprises a protruding surface.

15. The storage system of claim 12 wherein said plurality of slots includes a first engagement surface and said plurality of protrusions includes a second engagement surface for hindering lateral movement of said individual unit carriers when said individual unit carriers are in said second position.

16. The storage system of claim 15 wherein said first engagement surface comprises a C-shaped depression and said second engagement surface comprises a C-shaped protruding surface.

17. A storage system that facilitates the adjustment and rearrangement of a plurality of individual units comprising a housing having a first end and a second end for said plurality of individual units and a plurality of individual unit carriers for separately retaining said plurality of individual units, each of said plurality of individual unit carriers being slidable within said housing, said housing including a first end wall connected to said first end of said housing, a second end wall connected to said second end of said housing, and a first engagement member and said plurality of individual unit carriers including a second engagement member, said first and second engagement members movable between a first condition in which said second engagement member of one of said individual unit carriers is engaged with said first engagement member and a second condition in which said second engagement member of said one of said individual unit carriers is disengaged from said first engagement member, wherein when said first and second engagement members are in said first condition said one of said individual unit carriers is slidably movable between said first and second end walls within said housing but cannot be removed from said housing, and when said first and second engagement members are in said second condition said one of said individual unit carriers is removable from said housing in a direction of egress and replaceable at any location within said housing.

18. The storage system of claim 17 wherein said second engagement member of said one of said individual unit carriers can only be disengaged from said first engagement member when said individual unit is removed from said one of said individual unit carriers.

19. A storage system that facilitates the adjustment and rearrangement of a plurality of vertically stacked individual units comprising a housing having a first end and a second end for said plurality of individual units and a plurality of individual unit carriers for separately retaining said plurality of individual units, each of said plurality of individual unit carriers being slidable within said housing, said housing including a first end wall connected to said first end of said housing, a second end wall connected to said second end of said housing, a pair of housing side walls each including a first engagement member comprising a recess disposed along the length of said pair of housing side walls, and said plurality of individual unit carriers including a pair of carrier side walls each including a second engagement member engageable with said first engagement member comprising a protuberance disposed on said pair of carrier side walls, with each of said protuberances being positioned to be received within one of said recesses of said pair of housing side walls upon insertion of said plurality of individual unit carriers within said housing, said protuberances being retractable from said recesses in order to remove said plurality of individual unit carriers from said housing, whereby when said second engagement member of one of said individual unit carriers is engaged with said first engagement member said one of said individual unit carriers is releasably engaged and slidable between said first and second end walls within said housing, and when said second engagement member of said one of said individual unit carriers is disengaged from said first engagement member, said one of said individual unit carriers is removable from said housing in a direction of egress and replaceable at any location within said housing, said plurality of individual unit carriers being movable between a first position within said housing whereby said plurality of individual unit carriers is slidable within said housing, and a second position wherein said plurality of individual unit carriers is not slidable within said housing, said housing including a third engagement member comprising a plurality of slots extending horizontally from said recess in said direction of egress of said one of said plurality of individual unit carriers from said housing, whereby said second engagement member is engageable with said third engagement member when said one of said plurality of individual unit carriers is in said second position to thereby prevent vertical sliding of each of said plurality of individual unit carriers disposed above said one of said plurality of individual unit carriers within said housing.

20. A storage system that facilitates the adjustment and rearrangement of a plurality of vertically stacked individual units comprising a housing having a first end and a second end for said plurality of individual units and a plurality of individual unit carriers for separately retaining said plurality of units, each of said plurality of individual unit carriers being slidable within said housing, said housing including a first end wall connected to said first end of said housing, a second end wall connected to said second end of said housing, and a first engagement member, and said plurality of individual unit carriers including a second engagement member engageable with said first engagement member, whereby when said second engagement member of one of said individual unit carriers is engaged with said first engagement member said one of said individual unit carriers is releasably engaged and slidable between said first and second end walls within said housing, and when said second engagement member of said one of said individual unit carriers is disengaged from said first engagement member, said one of said individual unit carriers is removable from said housing in a direction of egress and replaceable at any location within said housing, said housing further including a plurality of first stabilizer members and said plurality of individual unit carriers each including a second stabilizing member, whereby upon removal of one of said plurality of individual unit carriers from said vertical stack within said housing each of said others of said plurality of individual unit carriers disposed vertically above said one of said individual unit carriers is stabilized against gravitational descent within said housing but remains physically slidable within said housing upon the exertion of a predetermined pressure thereon.

21. A storage system that facilities the adjustment and rearrangement of a plurality of vertically stacked individual units comprising a housing having a first end and a second end for said plurality of individual units and a plurality of individual unit carriers for separately retaining said plurality of individual units, each of said plurality of individual unit carriers being slidable within said housing, said housing including a first end wall connected to said first end of said housing, a second end wall connected to said second end of said housing, and a pair of housing side walls each including a first engagement member comprising a recess disposed along the length of said pair of housing side walls, and said plurality of individual unit carriers including a pair of opposing carrier side walls each including a second engagement member engageable with said first engagement member comprising a protuberance disposed on said pair of carrier side walls, with each of said protuberances being positioned to be received within one of said recesses of said pair of side walls upon insertion of said plurality of individual unit carriers within said housing, said protuberances being retractable from said recesses when said individual units are removed from said individual unit carriers in order to remove said plurality of individual unit carriers from said housing, whereby when said second engagement member of one of said individual unit carriers is engaged with said first engagement member said one of said individual unit carriers is releasably engaged between said first and second end walls within said housing, and when said second engagement member of said one of said individual unit carriers is disengaged from said first engagement member, said one of said individual unit carriers is removable from said housing in a direction of egress and replaceable at any location within said housing.

22. The storage system of claim 21 wherein said plurality of individual unit carriers is movable between a first position within said housing whereby said plurality of individual unit carriers is slidable within said housing and a second position wherein said plurality of individual unit carriers is not slidable within said housing, said housing including a third engagement member, whereby said second engagement member is engageable with said third engagement member when said one of said plurality of individual unit carriers is in said second position to thereby prevent vertical sliding of each of said plurality of individual unit carriers disposed above said one of said plurality of individual unit carriers within said housing.

23. A storage system that facilitates the adjustment and rearrangement of a plurality of individual units comprising a housing having a first end and a second end for said plurality of individual units and a plurality of individual unit carriers for separately retaining said plurality of individual units, each of said plurality of individual unit carriers being slidable within said housing, said housing including a first end wall connected to said first end of said housing, a second end wall connected to said second end of said housing, a pair of housing side walls, and a first engagement member, and said plurality of individual unit carriers including a second engagement member engageable with said first engagement member, whereby when said second engagement member of one of said individual unit carriers is engaged with said first engagement member said one of said individual unit carriers is releasably engaged and slidable between said first and second end walls within said housing, and when said second engagement member of said one of said individual unit carriers is disengaged from said first engagement member, said one of said individual unit carriers is removable from said housing in a direction of egress and replaceable at any location within said housing, each of said plurality of individual unit carriers including a pair of opposing carrier side walls, said pair of opposing side walls being sufficiently flexible such that flexing said pair of opposing side walls towards each other causes said second engagement member to disengage from said first engagement member only when said individual unit is removed from said one of said individual unit carriers whereby said plurality of individual unit carriers may be removed from said vertical stack within said housing.

* * * * *